United States Patent [19]
Fleisher et al.

[11] 4,177,355
[45] Dec. 4, 1979

[54] ARRAY DEVICE FOR DATA SCRAMBLING

[75] Inventors: Harold Fleisher; Se J. Hong, both of Poughkeepsie, N.Y.

[73] Assignee: International Business Machines Corporation, Armonk, N.Y.

[21] Appl. No.: 571,116

[22] Filed: Apr. 24, 1975

[51] Int. Cl.² .............................................. H04K 1/06
[52] U.S. Cl. ................................................... 178/22
[58] Field of Search .......................................... 178/22

[56] References Cited

U.S. PATENT DOCUMENTS

| | | | |
|---|---|---|---|
| 3,796,830 | 3/1974 | Smith | 178/22 |
| 3,798,360 | 3/1974 | Feistel | 178/22 |

*Primary Examiner*—Howard A. Birmiel
*Attorney, Agent, or Firm*—James E. Murray

[57] ABSTRACT

This specification describes an array logic chip that can be used to encipher and decipher binary data. The array logic chip contains a matrix of input and output lines with the input lines divided into groups that are each addressed by a different decoder. The digits of a block of data to be encoded are arranged in sets according to the position of the digits in the block and a different set of digits is fed into each of the decoders of the array logic chip. Substitution of new digits for the original digits in each set is accomplished in the matrix by configuration of connections between a group of input lines and output lines of the arrays and in the decoders by changing the configuration of the decoders so as to vary the input lines of the matrix selected by the input signals to the decoders. Transposition or changing of position of the digits in the block of data is accomplished in the selection of the output lines to which any given group of input lines is connected. Multiple substitutions and transpositions are accomplished by readdressing the decoders with the coded data signals on the output lines of the matrix and dynamic encoding is accomplished by continuously reconfiguring the decoders and changing the couplings between input and output lines of the matrix.

5 Claims, 3 Drawing Figures

ARRAY DEVICE FOR DATA SCRAMBLING

BACKGROUND OF THE INVENTION

The present invention relates to enciphering and deciphering data and more particularly to enciphering and deciphering binary data used in data processing systems.

Present-day computing centers usually have elaborate procedures for maintaining physical security at the location where the central processor and data storage facilities are located. Some of the procedures which have been used are restriction of personnel within the computer center, utilization of mechanical keys for activation of equipment, and camera observation. These security procedures, while providing a measure of safety in keeping unauthorized individuals from the physical computing center itself, are not effective with respect to large remote-access computer networks which have many terminals located at distant sites connected to the computing center by either cable or telecommunication lines. Nor are these measures meant to protect the data from persons authorized to be in the computing center but not authorized to handle the particular data.

To restrict access to data as opposed to access to facilities containing the data, techniques such as "memory protection" have been employed. This type of data security technique associates various segments of memory with a unique key. Circuits internal to the processor then check this key against a key associated with all instructions accessing the protected segments of memory to see if they are the same. While this type of protection is effective, sophisticated techniques can be employed by persons with knowledge of computing system circuits to obtain unauthorized use of protected data.

Therefore to insure security, it is necessary that the data itself be encoded in such a manner to prevent its use by all unauthorized personnel. The encoding of data is basically a mapping of all n-bit words to n or more bit words such that an inverse mapping exists. If the bare data consist of n-bit words and the encoded or scrambled data of m bit words where $m \geq n$ then there are $$\text{Max } N_c = 2^m!/(2^m - 2^n)! \tag{1}$$

possible codes or distinct mapping functions for the data. The magnitude of $N_c$ is an indication of the difficulty of code breaking. For instance, if the code is static, or fixed for a long duration, the key for a single one of these codes, or in other words that information necessary to decipher a given code, must contain a minimum of $\log_2 N_c$ bits of information.

By particularizing the above formulas for a n-bit to n-bit mapping we can see the number of digits needed to decipher a coded message. First:

$$\max N_c = (2^n)! \tag{1b}$$

and then:

$$\max \log_2 N_c \approx n2^n \tag{2}$$

Therefore, the number of bits of information about the code necessary to break an arbitrary n to n code would be:

| n... | 4 | 8 | 16 | 32 |
|---|---|---|---|---|
| bits... | 64 | $2^{11}$ | $2^{20}$ | $2^{37}$ |

Obviously even in the simple case of n to n mappings any practical coding scheme cannot encompass all possible codes due to the impractical length of the key. Therefore, in a viable coding scheme, the number of distinct codes $N_c$, is actually far less than the max $N_c$ given by the first equation, but large enough to defy unauthorized deciphering.

One such scheme of encoding involves arranging the digits of a block of data to be enciphered into a number of sets and placing each set of digits into a separate coding box called a substitution box because they replace binary numbers in the set with a different series of binary numbers. The outputs of these substitution boxes are fed to a single coding box called a permutation box in which the relative position of digits in the block of data are transposed so that after substitution and permutation the value and position of most of the coded digits is different from those of the original block of data. To foil any statistical attacks, the enciphered output of the permutation box is divided into sets and placed back into the substitution boxes several times to increase the total number of possible substitutions and transpositions.

DESCRIPTION OF THE INVENTION

While such schemes are effective in enciphering and deciphering the message, they usually require bulky special hardware and long enciphering and deciphering times. Therefore, in accordance with the present invention a simple array logic chip is provided that will perform both enciphering and deciphering of blocks of data. The array logic chip contains a matrix of input and output lines with the input lines divided into groups that are each addressed with different decoders. The data to be encoded is arranged in sets in accordance with position in the block of data and a different set of bits is placed in each of the decoders. Substitution is accomplished by varying the configuration of the connections between a group of input lines and output lines of the array. Transposition is accomplished in the matrix by the selection of the particular output lines to which any group of input lines is connected. Multiple substitutions and transpositions are accomplished by readdressing the decoders with the signals on the output line of the matrix and dynamic encoding is accomplished by continuously changing the substitution and transposition keys.

Therefore it is an object of the present invention to provide an enciphering and deciphering apparatus and/or method.

Another object of the invention is to provide an ordered arrangement of enciphering and deciphering apparatus.

It is a further object of the invention to provide simple and responsive means to encipher and decipher digital data.

THE DRAWINGS

These and other objects, features and advantages of the invention will be apparent from the following more particular description of the preferred embodiment of the invention as illustrated in the following figures of which:

DETAILED DESCRIPTION OF THE INVENTION

Figure 1:
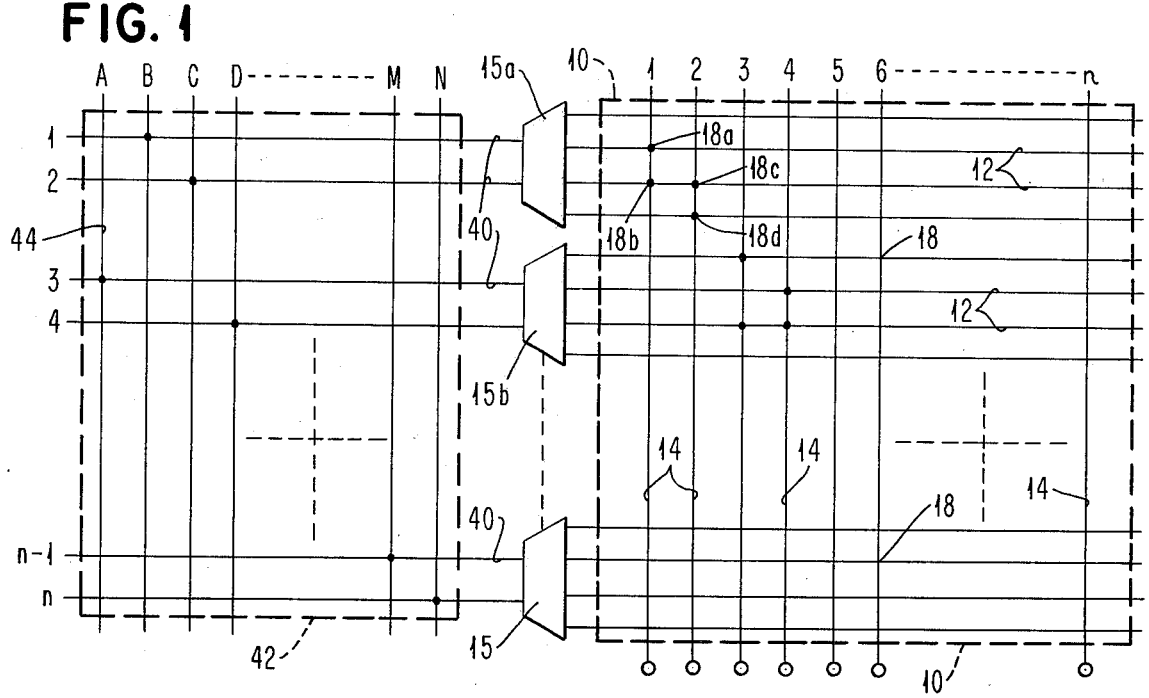
FIG. 1 shows a logic array in accordance with the present invention.
Figure 2:
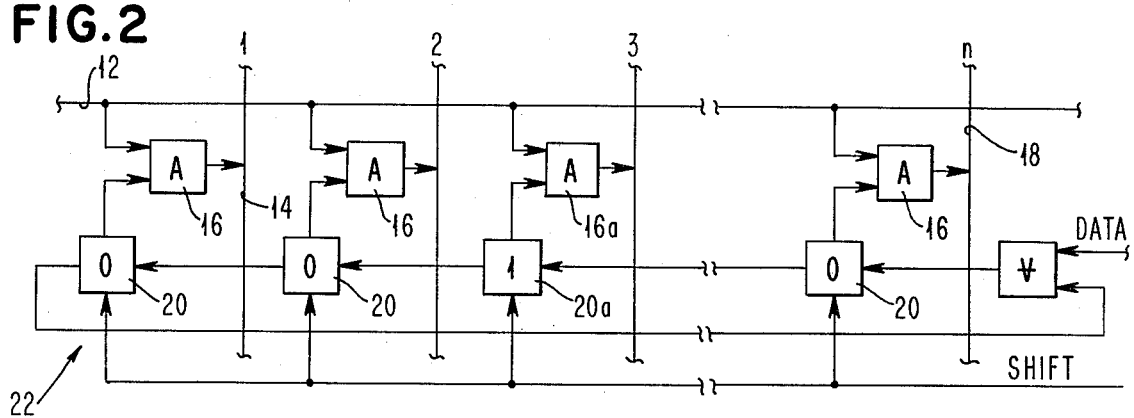
FIG. 2 shows means for statically and dynamically inserting keys into the matrix of that array to accomplish transposition.

FIG. 1 shows an array 10 of intersecting input and output lines 12 and 14 with each group of four input lines 12 addressed by a different 2-bit decoder 15. As shown in FIG. 2, an AND gate 16 is located at each intersection 18 of an input and output line of the array 10. In any particular row of AND gates in the array each AND gate receives one input from a common input line 12 and another input from a different stage 20 of a feedback shift register 22 associated with the particular input line of the array. The output of the AND gate 16 is fed to the output line 18 passing through the intersection. Therefore the data in the shift register controls the coupling between an input and output line of the array. When a binary 1 is stored in any stage 20a of the shift register 22 a signal placed on the input line 12 is reproduced on the output line 18a fed by the AND gate 16a. Otherwise the signal on the input line is masked from the output line.

Figure 3:
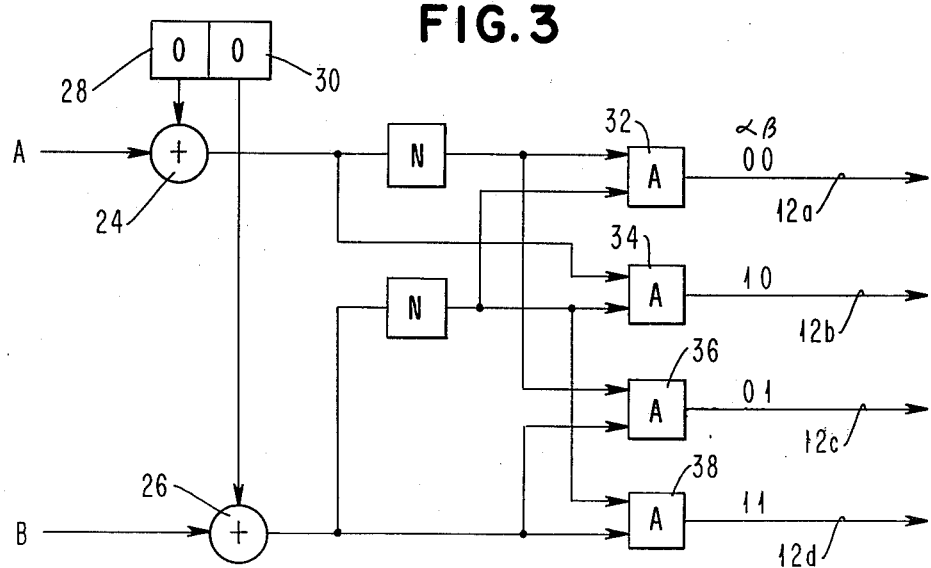
FIG. 3 shows the details of the decoders addressing the matrix of FIG. 1 to permit substitution.

The signals placed on the input lines 12 are controlled by the decoders 15 one of which is shown in detail in FIG. 3. The inputs A and B of the decoder are each an input to two different Exclusive OR circuits 24 and 26. The other input to the Exclusive OR circuit 24 and 26 is one of the stages 28 or 30 of a two-position register.

Either the true or inverted outputs of the Exclusive OR circuits are each fed to four AND circuits 32, 34, 36 and 38 so that depending on the input signals and the data in the shift registers one of the four output lines will be selected by the decoder. If a binary 0 is stored in both stages 28 and 30 of the register, the first line 12a will be selected when both inputs A and B are binary 0, the second line 12b will be selected when A is a binary 1 and B is a binary 0, the third line 12c will be selected when A is a binary 0 and B is a binary 1 and the last line 12d will be selected when both inputs A and B are binary 1. Of course as the data in stages 28 and 30 changes the line selected by the inputs A and B will also change.

The inputs to the decoders 15 are the output lines 40 of the second array 42 which is similar to array 10 in that input lines 44 of the array intersect the output lines 40 except where the input lines are vertical and the output lines horizontal. Like the first array there is an AND gate at each intersection 46 to the array that is controlled by a different stage of a shift register arranged along associated with each input line in the array. Therefore, the data (A B C D ... M or N) on any given input line 44 of the array 42 is transferred to output lines 40 of the array 42 as a function of the data in the shift register associated with that input line.

Any block of data of n bits where n is an even number can be enciphered and deciphered using the apparatus shown in the figures. First consider the simplest case. That is where a block of data of two bits is mapped into two coded bits. By Eq. (1) the max $N_c = 2^{2!} = 4! = 24$. If the original word is (A,B) and the enciphered word is $(\alpha, \beta)$ then the 24 codes can be enumerated as follows.

TABLE 1

| Code # | Code Description $(\alpha, \beta)$ |
|---|---|
| 1 | A,B |
| 2 | A,$\overline{B}$ |
| 3 | $\overline{A}$,B |
| 4 | $\overline{A},\overline{B}$ |
| 5 | (A=B),A |
| 6 | (A=B),$\overline{A}$ |
| 7 | (A=B),B |
| 8 | (A=B),$\overline{B}$ |
| 9 | (A≠B),A |
| 10 | (A≠B),$\overline{A}$ |
| 11 | (A≠B),B |
| 12 | (A≠B),$\overline{B}$ |
| code #13-24 | reversal of codes 1-12 |

The vertical personality (bits to be stored in the cells) for $\alpha$ and $\beta$ are:

TABLE 2

| \multicolumn{6}{c}{Personality Table} | | | | | |
|---|---|---|---|---|---|
| A | $\overline{A}$ | B | $\overline{B}$ | A=B | A≠B |
| 1 | 0 | 1 | 0 | 0 | 1 |
| 1 | 0 | 0 | 1 | 1 | 0 |
| 0 | 1 | 1 | 0 | 1 | 0 |
| 0 | 1 | 0 | 1 | 0 | 1 |

For instance, assume the two input variables A and B are applied to the terminals of the first decoder 15a and the stages 28 and 30 of this decoder are store 0s. Then the decoder 18a is programmed to place AB input combination 00 on the first line, 01 on the second, 10 on the third and 11 on the fourth. Therefore code #6 in Table 1 can be implemented by placing two ones in the stages 20 of the shift registers associated with points 18a and 18b and at 18c and 18d as shown in Table 2. Clearly then any 2 by 2 code in Table 1 can be implemented in this array using one decoder for input lines and two output lines of the array by simply changing the personality of the array 10 in accordance with Table 2.

Furthermore it should be apparent that any even number of digits n can be encoded using the 2 to 2 mapping described above as a kernel.

The n input bits are divided into n/2, 2=bit groups, each group of 2 bits is placed in a different decoder 15 and goes through mutually independent 2 to 2 mappings as above. The resulting n bits are then arbitrarily permuted to yield the encoded word.

The function of the G array or grouping array 42 is to group the n input bits into (the n/2) 2-bit groups mentioned above. Each row and column of the G array 42 contains one and only one digit in the data block. Each digit is placed on only one input line 44 and appears on only one output line 42. Each decoder 15a of the F array or Function Array 10 receives a single one of these groups of 2-bits and performs the 2 to 2 mapping according to the personality of the array along the input lines coupled to the decoder 12. Each decoder 15 is connected to four input lines in the F array 10 which are in turn connected by data in the shift register 22 to two and only two of the output lines 14. An output line associated with any decoder cannot be used to receive signals for any other decoder. For instance, if output line k is the result of the $j^{th}$ decoder, the personality of the array 10 along the $k^{th}$ output line would be all 0's except at those four intersections 18 of the $k^{th}$ line with the four input lines 12 coupled to the $j^{th}$ decoder. At those four intersections would be the appropriate 4-bit 2 to 2 mapping personality.

Let us now consider the size of the array hardware and the number of codes, or the distinct mappings, the basic array offers. The latter, as mentioned earlier, is an indication of the code unbreakability. Again we are only considering the even word length.

The Grouping array 42 contains $n^2$ bits, and the Function array 10 contains $2 \times n^2$ bits. The total number of bits in the array is, then $$N_B = 3n^2 \qquad (3)$$

There are $$\binom{n}{2} \cdot \binom{n-2}{2} \cdots \binom{2}{2}$$

ways of group n bits into n/2 groups of 2 bits each. There are 24/2=12 different order-independent 2—2 mapping functions per group. The final output ordering can be achieved in n! ways. Therefore, the total number $N_c$ of the codes delivered by the array device becomes $$N_c = \binom{n}{2}\binom{n-2}{2}\cdots\binom{2}{2} \cdot 12^{n/2} \cdot n! \qquad (4)$$
$$= 6^{n/2} \cdot (n!)^2$$

This number is very small when compared to the maximum $N_c$ of Eq. (1b). However, it is an enormous number by itself. Table 3 shows the $\log_2 N_c$ for some values of n. (If n=16, $N_c \approx 10^{33}$.)

TABLE 3

| $\log_2 N_c$ for some values of n | |
|---|---|
| n | $\log_2 N_c$ |
| 1 | |
| 2 | 4.584962501 |
| 4 | 14.33985 |
| 6 | 26.73859369 |
| 8 | 40.93826604 |
| 10 | 56.50693473 |
| 12 | 73.18068547 |
| 14 | 90.78123725 |
| 16 | 109.1799809 |
| 18 | 128.2797191 |
| 20 | 148.0043928 |
| 22 | 168.2928534 |
| 24 | 189.0948648 |
| 26 | 210.3684192 |
| 28 | 232.0778665 |
| 30 | 254.1925722 |
| 32 | 276.6859273 |
| 34 | 299.5346037 |
| 36 | 322.7179823 |
| 38 | 346.2177065 |
| 40 | 370.0173297 |
| 42 | 394.102031 |
| 44 | 418.4583863 |
| 46 | 443.0741789 |
| 48 | 467.9382441 |

To select a code in this array device, one should load an appropriate personality into the array. However, one need not handle $3n^2$ bits to specify the code. One can specify a key which represents the personality, which is much shorter than the personality length. The key to personality transformation should be simple to implement (either by software or hardware). The proposed key for an n to n mapping has the following format.

Key=Frontal permutation, 2—2 functions, End permutation (a) The frontal permutation is used just for grouping the inputs.

Since there are n! permutations, there are $2^{n/2}$ distinct permutations per distinct grouping. In this sense, the frontal permutation key is redundant and also many key specifications will give the same code. The Frontal permutation is given as n segments of $\lceil \log_2 n \rceil$ bit strings, each representing the input number appearing in the decoders, top to bottom in order. Thus, for example, the frontal permutation of B, C, A, D means that:

(i) the first decoder 15a gets inputs B and C in order, and (ii) the second decoder 18b gets inputs A and D in order, or more precisely, the personality of G array has all zeros except 2, 3, 1 and $4^{th}$ columns of 1, 2, 3 and $4^{th}$ row, respectively.

As far as the inputs to F array is concerned, the frontal permutation specifies where the actual inputs are coming from. So we might say that this is a FROM list of permutation.

B C A D FROM-Inputs to G

A B C D TO-Inputs to F (b) The 2—2 functions portion of the key is in n/2 segments of 4 bit strings, each specifying the 2—2 function number corresponding to the 2 bit group of inputs. There are 12 distinct functions independent of permutation as given in Table 1. Since the end permutation will finally dominate, we take the functions in order $(\alpha,\beta)$ as given by codes #1-12 of Table 1.

(c) The End permutation list is a TO-permutation list of functions to final outputs. This portion consists of n segments of $\lceil \log_2 n \rceil$ bit strings, each designating the output column of the corresponding function.

Let us take an example key, given as (2, 3, 1, 4; 6, 7; 1, 2, 3, 4) for n=4. The personality for G array is already shown in FIG. 1. The two outputs from the first decoder group are realized in the $1^{st}$ and the $2^{nd}$ columns in order. The two output bits from the second decoder portion go to $3^{rd}$ and $4^{th}$ output columns. FIG. 1 again shows the F array personality for the above key.

The number of bits in a key for an n to n coding is $$N_k = n\lceil \log_2 n \rceil + \frac{n}{2} \times 4 + n\lceil \log_2 n \rceil \qquad (5)$$
$$= 2n(1 + \lceil \log_2 n \rceil)$$

The following is a list of $N_k$ for a few values of n.

| n | 4 | 8 | 12 | 16 | 20 | 24 | 28 | 32 | 36 | 40 | 44 | 48 |
|---|---|---|---|---|---|---|---|---|---|---|---|---|
| $n_k$ | 24 | 64 | 120 | 160 | 240 | 288 | 326 | 384 | 504 | 560 | 616 | 672 |

If we had an ideal key system (information loss-less) the key length should be $\log_2 N_c$ given in Eq. (4). This number for large n becomes $$\lim_{n \to \infty} N_c = \log_2\left(6^{\frac{n}{2}} (n!)^2\right) \approx 2n\log_2 n + 1.3n \quad (6)$$

Now, one might say the proposed key has the efficiency of:

$$\eta = \frac{N_I}{N_k} \quad (7)$$

Again, as n becomes large the efficiency approaches 1.

$$\lim_{n \to \infty} \eta = \frac{2n\log_2 n + 1.3n}{2n\log_2 n + 2n} \longrightarrow 1 \quad (8)$$

This means that the key chosen is not only simple to implement but also fairly good in terms of efficiency.

Now we consider the inverse mapping process. If a key is used in scrambling the data we call it the encipher key. Similarly a decipher key is necessary to unscramble the message. The problem is then how to translate an encipher key into a decipher key which establishes the inverse mapping.

Recalling the construction of a key, for each 2-bit group we have,
(1) two numbers; where they are from (front permutation)
(2) one number; what mapping function (function) and
(3) two numbers; where the transformed 2 bits are going. (End permutation)

Therefore, the reverse process should take the two bits given by the end permutation (this becomes the FROM permutation for front), inverse the function (see Table 4), and put the resulting bits to where they came from (this becomes the TO permutation for end). Due to the set order in the functions, the final TO permutation for deciphering may be in reverse order of the enciphering from portion of the two bits.

The encipher to decipher key translation process can be summarized as follows:
(1) Copy the end permutation for the front permutation
(2) Convert each function to its inverse function, (by Table 4).
(3) Copy the front permutation for end permutation and pairwise reverse the order if necessary (see Table 4).

For example if the encipher key for 10 to 10 coding were
$K_E$=3,7,5,10,9,8,2,6,4,1;3,9,7,12,6;5,8,7,1,3,2,9,6,10,4.

TABLE 4

| | Inverse Functions & End Order | | | |
|---|---|---|---|---|
| Function # | $(\alpha, \beta)$=f(A,B) | Inverse function # | $f^{-1}(\alpha, \beta)$ | End Order Change |
| 1 | A,B | 1 | A,B | no |
| 2 | A,$\overline{B}$ | 2 | A,B | no |
| 3 | $\overline{A}$,B | 3 | A,B | no |
| 4 | $\overline{A}$,$\overline{B}$ | 4 | A,B | no |
| 5 | (A=B),A | 7 | B,A | yes |
| 6 | (A=B),$\overline{A}$ | 12 | B,A | yes |
| 7 | (A=B),B | 7 | A,B | no |
| 8 | (A=B),$\overline{B}$ | 12 | A,B | no |

TABLE 4-continued

| | Inverse Functions & End Order | | | |
|---|---|---|---|---|
| Function # | $(\alpha, \beta)$=f(A,B) | Inverse function # | $f^{-1}(\alpha, \beta)$ | End Order Change |
| 9 | (A≠B),A | 11 | B,A | yes |
| 10 | (A≠B),$\overline{A}$ | 8 | B,A | yes |
| 11 | (A≠B),B | 11 | A,B | no |
| 12 | (A≠B),$\overline{B}$ | 8 | A,B | no |

Using Table 4, $K_D$=5,8,7,1,3,2,9,6,10,4;3,11,7,8,12;3,7,<u>10,5,9</u>,8 12,6,<u>4,1</u>.

where the underline shows the order reversal of the pairs.

The translation can take place from the decipher key to the encipher key using the same rules. This gives a choice of retaining either the encipher key or the decipher key with the code, which is an additional flexibility.

We have discussed so far a static coding scheme where the code is fixed for some duration, until the key is manually changed. When the key is automatically changing in some predetermined sequence, we call it the dynamic coding. A simple method of achieving this is through circulating the personalities of the array by having the shift registers 22 in some shifting mode rather than statically storing data. Obviously, dynamic coding is much more difficult to break than the static one.

The circulation of the data in the shift registers is done either in G array or F array or both. Once the starting key is set in, the personality of the arrays can shift circularly to left or to right at any predetermined word intervals. The circulation can be done at different intervals in F and G array. The only restriction is that the encoder's G array and decoder's F array must shift at the same intervals and the F (encoder) and G (decoder) must shift at the same intervals. These intervals can be fixed or specified by an additional key.

One shift of G array cells corresponds to changing the Front-permutation key of the encoder by modifying each from-designation i to i+1 mod n. (Notice the inputs are numbered 0 through n−1.) Of course, if the shift direction is reversed, the modification is i to i−1 mod n. For the decoder, then, the end permutation must shift the same way. Therefore, the decoder should shift in the F array, to compensate the change.

We give all possible examples of employing the above circulation-dynamic coding in the following Table 5. Arrows indicate the direction of circulation. $S_1$ and $S_2$ designate clocks.

The clocks generate the shift-pulses for the arrays at some set word intervals. The most general form would be some arbitrary function on the word counts for Bidirectional shift registers.

TABLE 5

| | Many Modes of Circulation | | | |
|---|---|---|---|---|
| | Encoder | | Decoder | |
| Case | G | F | G | F |
| a | no | no | no | no ← static |
| b | →$S_1$ | no | no | →$S_1$ |
| c | ←$S_1$ | no | no | ←$S_1$ |
| d | no | →$S_1$ | →$S_1$ | no |
| e | no | ←$S_1$ | ←$S_1$ | no |
| f | →$S_1$ | →$S_2$ | →$S_2$ | →$S_1$ |

TABLE 5-continued

| | Many Modes of Circulation | | | |
|---|---|---|---|---|
| | Encoder | | Decoder | |
| Case | G | F | G | F |
| g | →S$_1$ | ←S$_2$ | ←S$_2$ | →S$_1$ |
| h | ←S$_1$ | →S$_2$ | →S$_2$ | ←S$_1$ |
| i | ←S$_1$ | ←S$_2$ | ←S$_2$ | ←S$_1$ |

Now, let us examine a trivial, yet a powerful way of making n to m (m>n) codes. Let m=n+k (k>0). The scheme is to simply extend the number of output columns of F array to m. An arbitrary k columns out of m are then personalized with a random 1's and 0's. The remaining n columns carry the same information as before.

The number of array bits now becomes:

$$N_{BE} = 3n^2 + 2nk \qquad (9)$$

The number of distinct codes becomes (see Eq. (4))

$$N_{CE} = N_c \cdot (15^{\frac{n}{2}} \neq 1)^k \binom{m}{k} \qquad (10)$$

$$= \binom{n+k}{k}(n!)^2 6^{\frac{n}{2}} \left(15^{\frac{n}{2}} + 1\right)^k$$

$$\approx \binom{n+k}{k}(n!)^2 \cdot 6^{\frac{n}{2}} \cdot 15^{\frac{nk}{2}}.$$

The k-columns contain extraneous or "garbage" information. The k-garbage columns have $(15^{n/2}+1)$ distinct output functions each. The reason is, if any decoder portion of a column contains all 1's, the output becomes 0 regardless of inputs. There are, $2^4-1=15$ ways of personalizing each decoder portion for all non-zero output functions. There are n/2 decoders. Hence, the result is, $15^{n/2}$ plus one for the null function on inputs.

The encoder then has m=n+k columns in F array and the decoder should have m input columns in G array. Since the personality of the garbage columns does not have to be retained, the only change to the key would be that of specifying the permutations. Each designation in the end permutation of the encoder key and the front permutation of the decoder key would require log$_2$ m bits instead of log$_2$ n bits, i.e.

$$N_{KE} = n\lceil \log_2 n \rceil + 2n + n\lceil \log_2 m \rceil \qquad (11)$$

$$= n\left(2 + \lceil \log_2 n \rceil + \lceil \log_2 m \rceil\right)$$

which is a modest increase, if any, compared to Eq. (5). The key efficiency is now somewhat meaningless, since the garbage function is not retained. Therefore, the key efficiency, calculated by Eq. (7) may well exceed 1 as k grows.

The number of codes literally sky rockets by each addition of bits (k) as seen from Eq. (10). The numbers in Table 3 correspond to the case when n=m or k=0.

One final comment on the Extended-codes as given above is that all the arguments for the circulation directly apply. Therefore, the extended codes can be made dynamic using the same shift register arrangements in the arrays. The only change is the size of the encoder's F array and the decoder's G array.

A major advantage of the array scheme presented here is the fact that the whole coder hardware can be packaged in one LSI chip. The arrays and the support circuitry can be packaged in one of two chips. Such a chip in current technology could be built for about 30 input, output bit words, with the chip delay of 10 nano seconds or less, depending on technology.

The implication is that the scrambling can be done in the interface of the memory and the CPU if desired. Also in time sharing, terminal oriented environment, the terminals can be equipped with the device. In APL, work spaces can be automatically scrambled with every save command.

The scheme can be implemented in the regular array logic if desired. However, there will be some decrease in the number of code words with the regular arrays.

The key can be abbreviated for the user if desired. The user may be assigned with a semi permanent permutation key corresponding to his user ID by the CPU, and he provides, for example, just the function key portion. Then he only has to deal with 2n key bits.

The number of the codes is very high. However, if additional enciphering complexity is desired, one can cascade 2 codes (since one coder is only one chip) to obtain further scrambling. Of course, this can be done in more than 2 stages. These considerations are possible because of small hardware and delay in coding.

Up until now we have been discussing the arrays as if the data stored in the stages 28 and 30 of each of the registers associated with decoders is 0. However, as pointed out previously, the data stored in each of these stages does affect which line is selected by any given combination of the two inputs to the decoders 15 therefore changing the data in the stages which has the same effect as changing the data along any given output line of the array and thereby enables the substitution of new digits for the original digits.

Therefore it should be obvious to those skilled in the art that changes and improvements can be made to the present invention without departing from the spirit and scope of the invention.

What is claimed is:

1. Apparatus for enciphering and deciphering a block of n data bits comprising;
   a matrix of crossing input and output lines,
   decoders each addressing a different group of the input lines,
   grouping means for dividing the message to be enciphered or deciphered into m sets of n/m bits each and addressing each of the decoders with one set of bits,
   said grouping means including a second matrix of crossing input and output lines each of input lines being adapted to receive one of the n data bits and each output line being connected to one of the inputs of one of the decoders,
   means at certain of the crossings of said second matrix to couple certain of the input lines to certain of the output lines to thereby generate the m sets,
   substitution means for selectively connecting each group of input lines to at least m output lines at certain crossings of the input lines in the group with the m output lines to substitute coded digits for the digits in the original message to encode messages, and, transposition means for changing the m output lines to which any group of input lines are connected to place digits in a different location in the encoded message than they were in the original message.

2. Apparatus for enciphering and deciphering a block of n data bits comprising;

a matrix of crossing input and output lines, decoders each addressing a different group of the input lines, grouping means for dividing the message to be enciphered or deciphered into m sets of n/m bits each and addressing each of the decoders with one set of bits, substitution means for selectively connecting each group of input lines to at least m output lines at certain crossings of the input lines in the group with the m output lines to substitute coded digits for the digits in the original message to encode messages, transposition means for changing the m output lines to which any group of input lines are connected to place digits in a different location in the encoded message than they were in the original message, and storage means associated with each crossing and an AND gate means associated with each crossing having one input coupled to the output of the storage means, another input coupled to the input line forming the crossing and an output coupled to the output line forming the crossing.

3. The apparatus of claim 2 wherein said storage means associated with all the crossings forming by one input line are different stages of the same shift register.

4. The apparatus of claim 3 including shift means and input means for changing the position and value of data in the shift registers so that said AND gate means, shift registers, shift means and input means form the substitution and transposition means of the apparatus.

5. The apparatus of claim 4 wherein said grouping means includes:

a second matrix of crossing input and output lines each of input lines being adapted to receive one of the n data bits and each output line being connected to one of the inputs of one of the decoders and, means at certain of the crossings to couple certain of the input lines to certain of the output lines to thereby generate the m sets.

* * * * *